United States Patent [19]

Sato et al.

[11] Patent Number: 5,665,457
[45] Date of Patent: Sep. 9, 1997

[54] PRINTED DECORATIVE PAPER HAVING A THREE DIMENSIONAL PATTERN AND A PROCESS FOR THE PRODUCTION THEREOF

[75] Inventors: Tohru Sato, Tokyo; Yoshimi Yoshida, Tokto; Fumio Watanabe, Tokyo, all of Japan

[73] Assignees: Toppan Printing Co., Ltd; Toyo Ink Manufacturing Co. Ltd., both of Tokyo, Japan

[21] Appl. No.: 503,004

[22] Filed: Jul. 17, 1995

[30] Foreign Application Priority Data

Jul. 18, 1994 [JP] Japan .................................. 6-187827

[51] Int. Cl.$^6$ ......................................... B32B 9/00
[52] U.S. Cl. ...................... 428/195; 428/190; 428/204; 428/207; 428/411.1; 428/515; 428/530; 428/534; 428/537.5; 428/542.2; 156/275.5; 156/277; 156/307.4
[58] Field of Search ........................ 428/195, 204, 428/206, 534, 515, 207, 190, 191, 205, 530, 542.2, 537.5, 411.1; 156/307.4, 275.5, 277

[56] References Cited

U.S. PATENT DOCUMENTS

| | | | |
|---|---|---|---|
| 4,196,033 | 4/1980 | Arai et al. | 156/196 |
| 4,954,556 | 9/1990 | Bull et al. | 524/378 |
| 5,019,202 | 5/1991 | Kawahata | 156/277 |
| 5,262,222 | 11/1993 | Kingman | 428/195 |

*Primary Examiner*—Patrick Ryan
*Assistant Examiner*—Abraham Bahta
*Attorney, Agent, or Firm*—Staas & Halsey

[57] ABSTRACT

Printed decorative paper having a three dimensional pattern comprises base paper 1, a printed design layer 2 formed of a water-based ink as an undercoat on a surface of the base paper, an overlying printed design pattern layer 3 formed of a water-based curable ink containing a repellent in harmony with said pattern in the undercoat, and overlying water-based curable topcoat 4 applied to the entire surface of the base paper in such a way that said topcoat in the areas where said printed design pattern layer 3 is formed is repelled to form concavities 5. This printed decorative paper is environment friendly due to the non-use of organic solvents, is enhanced in durability as a interior decor material and can be produced with high efficiency.

13 Claims, 1 Drawing Sheet

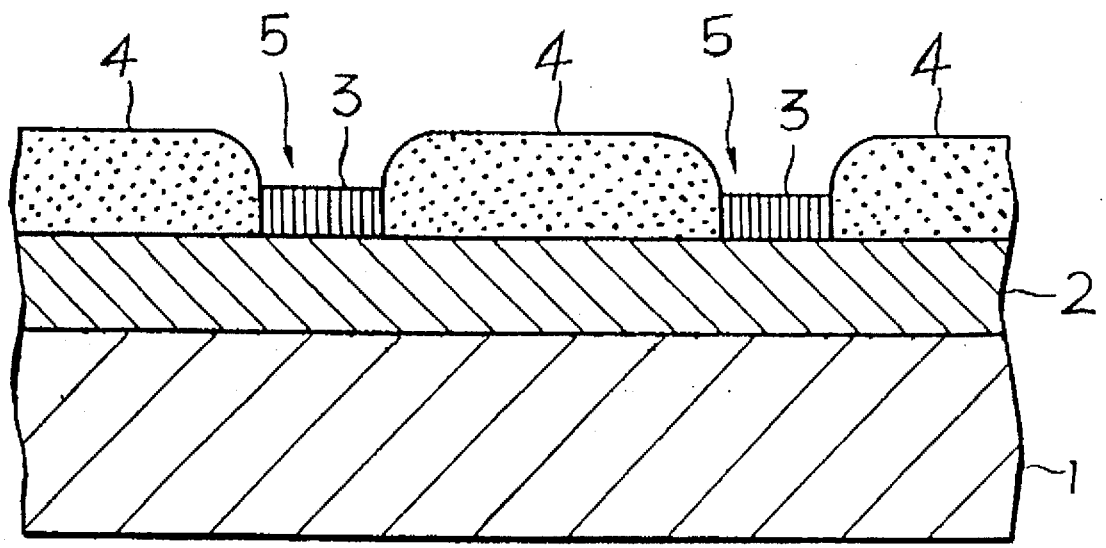

PRINTED DECORATIVE PAPER HAVING A THREE DIMENSIONAL PATTERN AND A PROCESS FOR THE PRODUCTION THEREOF

BACKGROUND OF THE INVENTION

This invention relates to printed decorative paper having a three dimensional pattern suitable for use as a residential interior material or a furniture surfacing material. More particularly, the invention relates to printed decorative paper having a three dimensional pattern that is environment friendly and which yet has enhanced durability as a interior decor material, as well as a process for producing such paper.

Printed decorative paper having a grained pattern that imitates the texture of natural, quality wood can be produced by forming a concave pattern of pores in harmony with a printed grain pattern. Various processes have been proposed to implement this approach. According to the proposal made in JPB 89/17427, a pattern is printed on the surface of a substrate, a pore pattern is then applied from a curable ink composition containing a repellent and, subsequently, a thermosetting paint is coated on the entire surface of the substrate and heated so that the paint is repelled from the areas where the curable ink composition has been applied, thereby forming concavities.

The ink and paint compositions used in this conventional method are oil-based and the organic solvents they contain may potentially jeopardize the health of the operating personnel. Additionally, this method requires large-scale exhaust facilities such as solvent recovery equipment and incinerators. What is more, the use of organic solvents is incapable of meeting the global demand for a "clean environment".

Another problem with the prior art is that the curable ink composition containing a repellent dries so slowly that the printing speed and, hence, the process efficiency cannot be increased beyond a certain limit.

The use of oil-based ink and paint compositions presents a further problem in that the pore pattern formed of the curable ink composition containing a repellent has an insufficient solvent resistance to avoid the surface of grained decorative paper from being deteriorated by common solvents such as alcohol, petroleum benzine and lacquer thinner.

SUMMARY OF THE INVENTION

The present invention has been accomplished under these circumstances and has as an object providing printed decorative paper having a three dimensional pattern that is environment friendly due to the non-use of organic solvents, that is enhanced in durability as a interior decor material and that can be produced with high efficiency.

Another object of the invention is to provide a process for producing such printed decorative paper.

The first object of the invention can be attained by printed decorative paper having a three dimensional pattern that comprises base paper, a printed design layer formed of a water-based ink as an undercoat on a surface of the base paper, an overlying printed design pattern layer formed of a water-based curable ink containing a repellent in harmony with said pattern in the undercoat, and an overlying a water-based curable topcoat applied to the entire surface of the base paper in such away said topcoat in the areas where said printed design pattern layer is formed is repelled to form concavities.

The second object of the invention can be attained by a process which comprises forming a printed design layer of a water-based ink as an undercoat on a surface of base paper, overlying said undercoat with a printed design pattern layer formed of a water-based curable ink containing a repellent in harmony with said pattern in the undercoat, applying a water-based curable topcoat to the entire surface of the base paper, and heating the applied coats with the temperature being varied stepwise such that said topcoat in the areas where said printed design pattern layer is formed is repelled to form concavities.

In a preferred embodiment, the applied coats are heated with the temperature being increased in steps.

BRIEF DESCRIPTION OF THE DRAWING

FIG. 1 is a sectional view of printed decorative paper as produced by the invention.

DETAILED DESCRIPTION OF THE INVENTION

FIG. 1 is a sectional view of printed decorative paper as produced by the invention. As shown, the printed decorative paper comprises base paper 1, a printed design layer 2 formed of water-based ink as an undercoat, a printed pore pattern layer 3 formed of water-based curable ink containing a repellent, a water-based curable topcoat 4, and concavities 5 that are formed as the result of repellency of the topcoat 4 in the areas where the printed pore pattern layer 3 is formed.

Base paper 1 may be of any materials that are commonly used to form the base paper of decorative paper, including, for example, tissue paper, resin mixed paper and resin impregnated paper that have a basis weight of about 23–100 $g/m^2$.

The printed design layer 2 as an undercoat is formed, typically to imitate the grain of wood, by any known printing technique using water-based ink that employs a vehicle such as an aqueous acrylic resin which is kneaded with a colorant and various other additives, as well as diluent water. In order to hide the color of base paper 1, its surface may be subject to overall printing with a suitable color before the design layer is printed. Alternatively, for the purpose of closing small holes in the surface of base paper 1 and improving its adhesion, a water-based sealer layer (water-based undercoat layer) may be formed on base paper 1, followed by optional overall printing, and the design layer is printed.

Printed pore pattern layer 3 is formed by any known printing technique using a water-based curable ink containing a repellent such that it is in harmony with the design in the undercoat (imitating the grain of wood). The water-based curable ink applied to form the printed pore pattern layer 3 comprises a curing vehicle that is mixed with diluent water, as well as a repellent and various other additives. The curable vehicle may be a two-component curable type that has a curing agent added to a base resin selected from among melamine resins, acrylic resins, and urethane resins. A two-component curable vehicle that has aziridine added as a curing agent to an aqueous acrylic resin is particularly preferred for use since it features a high reaction rate and provides high physical properties. Examples of the repellent that may be added to the curable ink include silicone resins, fluorocarbon resins and waxes. These water-based curable inks are satisfactory in various physical properties and durability. Fluorocarbon resins are particularly desirable since they lower the surface tension of ink, thereby providing enhanced repellency. The repellent may be preloaded as an aqueous emulsion in an ink composition or, alternatively, it may be added to the ink composition just before use. The repellent is preferably contained in an amount of about 5–70 wt % of the ink composition.

The topcoat 4 is made from a formulation that has various additives incorporated in a water-based curable topcoat composition that comprises a melamine, acrylic or urethane resin as a base component to which is added a curing agent. In order to assure resistance that complies with the Japanese Agricultural Standards (JAS), a two-component curable vehicle that has aziridine or an epoxy compound added as a curing agent to an aqueous acrylic resin is employed with particular advantage. The topcoat 4 may be applied by any customary coating techniques including roll coating, gravure coating, bar coating, air-knife coating, flow coating and curtain coating. The coating weight is not limited to any particular value but the range from about 4 to 10 g/m$^2$ on a dry bases is suitable.

The topcoat 4 is applied to the entire surface of the base paper 1 including the printed pore pattern layer 3 and thereafter dried by heating with the temperature being varied stepwise. When the topcoat 4 is applied to cover the entire surface of the base paper and subsequently heated, the topcoat formed in the areas where the printed pore pattern layer 3 was formed is not only repelled but also pulled by the surrounding areas to form concavities 5 (see FIG. 1); as a result, printed decorative paper is produced that has a concave pore pattern formed in harmony with the pattern imitating the grain of wood. Heating is effected with the temperature being varied in steps, desirably from law to high level. The specific temperature condition will differ more or less depending upon the kind of the ink and coating solution used; it is generally preferred to vary the temperature stepwise over the range from 20° to 200° C. A specific heating profile will be found in the example that appears later in this specification.

If heating is effected in one step at a comparatively high temperature, the topcoat may be repelled incompletely or a silicone resin or other repellents may bleed out as a white dust, that will impair the aesthetic appearance and, hence, quality, of the final product.

The following example is provided for the purpose of further illustrating the present invention but is in no way to be taken as limiting.

EXAMPLE

A surface of tissue paper (basis weight=30 g/m$^2$) was subjected to overall gravure printing with water-based ink. Then, a design imitating the grain of wood was gravure printed with a similar water-based ink.

In the next step, a pore pattern was gravure printed in harmony with the grain design using a water-based curing ink containing a repellent according to the following recipe.

| Water-based curing ink formula (all "parts" are by weight) | |
| --- | --- |
| Pigment | 5 parts |
| Acrylic resin | 40 parts |
| Curing agent (aziridine) | 12 parts |
| Repellent (fluorocarbon resin) | 6 parts |
| Diluent (water) | 37 parts |

Subsequently, a water-based curing topcoat of the formula shown below was gravure coated on the entire surface to give a deposit of 6 g/m$^2$ on a dry basis.

| Water-based curing topcoat formula | |
| --- | --- |
| Acrylic resin | 75 parts |
| Curing agent (epoxy compound) | 10 parts |
| Release agent (silicon resin) | 0.5 parts |
| Diluent (water) | 24.5 parts |

The resulting decorative paper was dried by heating as it was passed through a hot oven consisting of 6 zones (with the respective lengths and temperatures set forth below) at a speed of 150 m/min.

| Zone | Length, m | Temperature, °C. |
| --- | --- | --- |
| 1 | 3.0 | 40 |
| 2 | 3.0 | 80 |
| 3 | 3.0 | 90 |
| 4 | 3.0 | 100 |
| 5 | 4.5 | 120 |
| 6 | 4.5 | 140 |

As a result of this drying with heat, the topcoat in the areas where the pore pattern was formed was repelled to provide a concave surface having a good aesthetic appeal. The printed decorative paper as the final product has a concave pore pattern in harmony with the grained design.

The present invention offers the following advantages.

First, the use of water-based coating solutions and inks eliminates the health and environmental problems associated with the use of organic solvents in the prior art. As a result, the heretofore required large-scale exhaust facilities are obviated and one can produce environment friendly printed decorative paper.

Secondly, being produced with water-based curing materials, the printed decorative paper of the invention has sufficient resistance to detergents and thinners customarily used in cleaning operations so that it has enhanced durability for use as a interior decor material.

Thirdly, the water-based curable ink used to form a pore pattern dries quickly and the topcoat is repelled efficiently so that the production speed can be made faster than in the prior art (e.g. to accomplish printing at 150 m/min or so) and one can produce printed decorative paper of high quality having a concave pore pattern in harmony with a grained design.

What is claimed is:

1. A process for producing printed decorative paper having a three dimensional pattern comprising the steps of:

forming a printed design layer of a water-based ink as an undercoat on a surface of base paper;

overlaying said undercoat with a printed design pattern layer formed of a water-based curable ink containing a repellent corresponding with said pattern in the undercoat;

applying a water-based curable topcoat to the entire surface of the base paper; and heating the applied coats with the temperature being varied stepwise such that said topcoat in the areas where said printed design pattern layer is formed is repelled to form concavities.

2. A process according to claim 1, wherein the heating is effected with the temperature being increased in steps.

3. A process according to claim 2 wherein the heating is effected with the temperature being increased from 20° to 200° C.

4. A process according to claim 1 wherein said water-based curable ink containing a repellant has water added as a diluent to a curing vehicle.

5. A process according to claim 4 wherein said curing vehicle comprises a curing agent added to a melamine resin, an acrylic resin or a urethane resin.

6. A process according to claim 5 wherein said curing agent is an aziridine in an aqueous acrylic resin.

7. A process according to claim 1 or 4 wherein said repellent is a silicone resin, a fluorocarbon resin or a wax.

8. A process according to claim 7 wherein said repellent is a fluorocarbon resin.

9. A process according to claim 1 or 4 wherein said repellent is added in an amount of 5–70 wt % of the ink composition.

10. A process according to claim 1 wherein said water-based curable topcoat has water added as a diluent to a curing vehicle.

11. A process according to claim 10 wherein said curing vehicle is a two-component type having a curing agent added to a melamine resin, an acrylic resin or a urethane resin.

12. A process according to claim 11 wherein said curing agent is an aziridine or an epoxy compound in an aqueous acrylic resin.

13. A process according to claim 1 wherein said topcoat is applied to give a deposit of 4–10 $g/m^2$ on a dry basis.

* * * * *